United States Patent [19]
Asoh

[11] Patent Number: 4,840,424
[45] Date of Patent: Jun. 20, 1989

[54] AUTOMOTIVE REAR UNDERBODY STRUCTURE

[75] Inventor: Seiichi Asoh, Higashihiroshima, Japan

[73] Assignee: Mazda Motor Corporation, Hiroshima, Japan

[21] Appl. No.: 176,179

[22] Filed: Mar. 31, 1988

[30] Foreign Application Priority Data

Mar. 31, 1987 [JP] Japan .................................. 62-80604
Mar. 31, 1987 [JP] Japan ............................ 62-49307[U]
Apr. 7, 1987 [JP] Japan .................................. 62-85087

[51] Int. Cl.⁴ .............................................. B60J 1/00
[52] U.S. Cl. ................................................... 296/204
[58] Field of Search ............... 296/203, 204, 205, 209; 280/781

[56] References Cited

U.S. PATENT DOCUMENTS 2,613,986 10/1952 Heyl, Jr. .............................. 296/204
3,176,786 4/1965 Seidl .................................... 296/204

FOREIGN PATENT DOCUMENTS 58-45173 3/1983 Japan .

Primary Examiner—Joseph F. Peters, Jr.
Assistant Examiner—Jesus D. Sotelo
Attorney, Agent, or Firm—Wenderoth, Lind & Ponack

[57] ABSTRACT

A rear underbody structure includes a pair of side sills each having a generally closed cross-section and extending longitudinally of the automobile while spaced apart from each other in a direction extending widthwise of the automobile, a respective rear frame member connected end-to-end with each of the side sills so as to extend rearwardly of the automobile, a first cross member connected at its opposite ends to the rear frame members, respectively, so as to extend widthwise of the automobile, and a second cross member connected at its opposite ends to the rear frame members, respectively, so as to extend widthwise of the automobile and disposed rearwardly of the first cross member with respect to the automobile.

17 Claims, 5 Drawing Sheets

AUTOMOTIVE REAR UNDERBODY STRUCTURE

BACKGROUND OF THE INVENTION 1. (Field of the Invention)

The present invention generally relates to an automobile body structure and, more particularly, to a rear bottom frame structure, or a rear underbody structure, for automobiles.

2. (Description of the Prior Art)

Japanese Laid-open Utility Model Publication No. 58-45173, published in 1983, discloses a rear underbody structure for automobile comprising a pair of side sills each having a generally closed cross section and extending in a direction longitudinally of the automobile, said side sills spaced apart from each other in a direction extending widthwise of the automobile, a suspension member connected at opposite ends to the respective side sills and having a generally channel-shaped cross section open towards the front of the automobile, a fuel tank accommodated within the channel-sectioned suspension member, a rear frame connected at a front end with the suspension member, and a suspension arm supported for pivotal movement so as to extend from a portion adjacent the joint between each side sill and the suspension member.

According to the prior art rear underbody structure discussed above, while the rigidity of the suspension member surrounding the fuel tank has been improved, no consideration has been paid to the physical strength and the rigidity of the rear frame during an automobile collision in which the rear frame may be subjected to a considerable impact. In addition, the prior art rear underbody structure cannot exhibit a satisfactory frame rigidity against forces transmitted through the suspension arm longitudinally, widthwise and vertically of the automobile.

SUMMARY OF THE INVENTION

Accordingly, the present invention has been devised to substantially eliminate the above-discussed problems inherent in the prior art rear underbody structure for automobile and has as its essential object to provide an improved rear underbody structure for automobiles which is rigid enough to substantially prevent any possible crushing of a rear compartment of the automobile in the event of an automobile collision.

In order to accomplish the above-described object, the rear underbody structure according to a preferred embodiment of the present invention comprises a pair of side sills each having a generally closed cross section and extending longitudinally of the automobile, said side sills spaced apart from each other in a direction extending widthwise of the automobile, a respective rear frame member connected end-to-end with each one of the side sills so as to extend rearwardly of the automobile, and a first cross member connected at its opposite ends to the rear frame members, respectively, so as to extend widthwise of the automobile in the same plane in which the rear frame members lie, and a second cross member connected at its opposite ends to the rear frame members, respectively, so as to extend widthwise of the automobile in said plane, said second cross member being disposed rearwardly of the first cross member with respect to the automobile.

Preferably, the opposite ends of the second cross member are rigidly connected to respectively rear ends of the rear frame members so as to complete a so-called perimeter structure.

Preferably, corner members may be used to connect the opposite ends of the second cross member to the rear ends of the rear frame members. With these corner members interposed between the ends of the second cross member and the rear ends of the rear frame members, each of the corner members extends generally diagonally between the second cross member and a respective rear frame member.

Preferably, each of the rear frame members may be a frame member having a substantially closed cross section. Similarly, the second cross member may also be a frame having a substantially closed cross section. Alternatively, a closed cross-sectional form of any one of the rear frame members and the second cross members may be rendered by employing a frame member having a generally u-shape cross section in combination with a side plate member rigidly bolted or welded at its opposite sides to the U-shaped frame member so as to close the U-shaped frame member.

The rear underbody structure may further comprise a suspension support member which may be fitted to the rear frame members at respective locations in the vicinity of the joints between the second cross member and the rear frame members.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE PREFERRED EMBODIMENT

Figure 1:
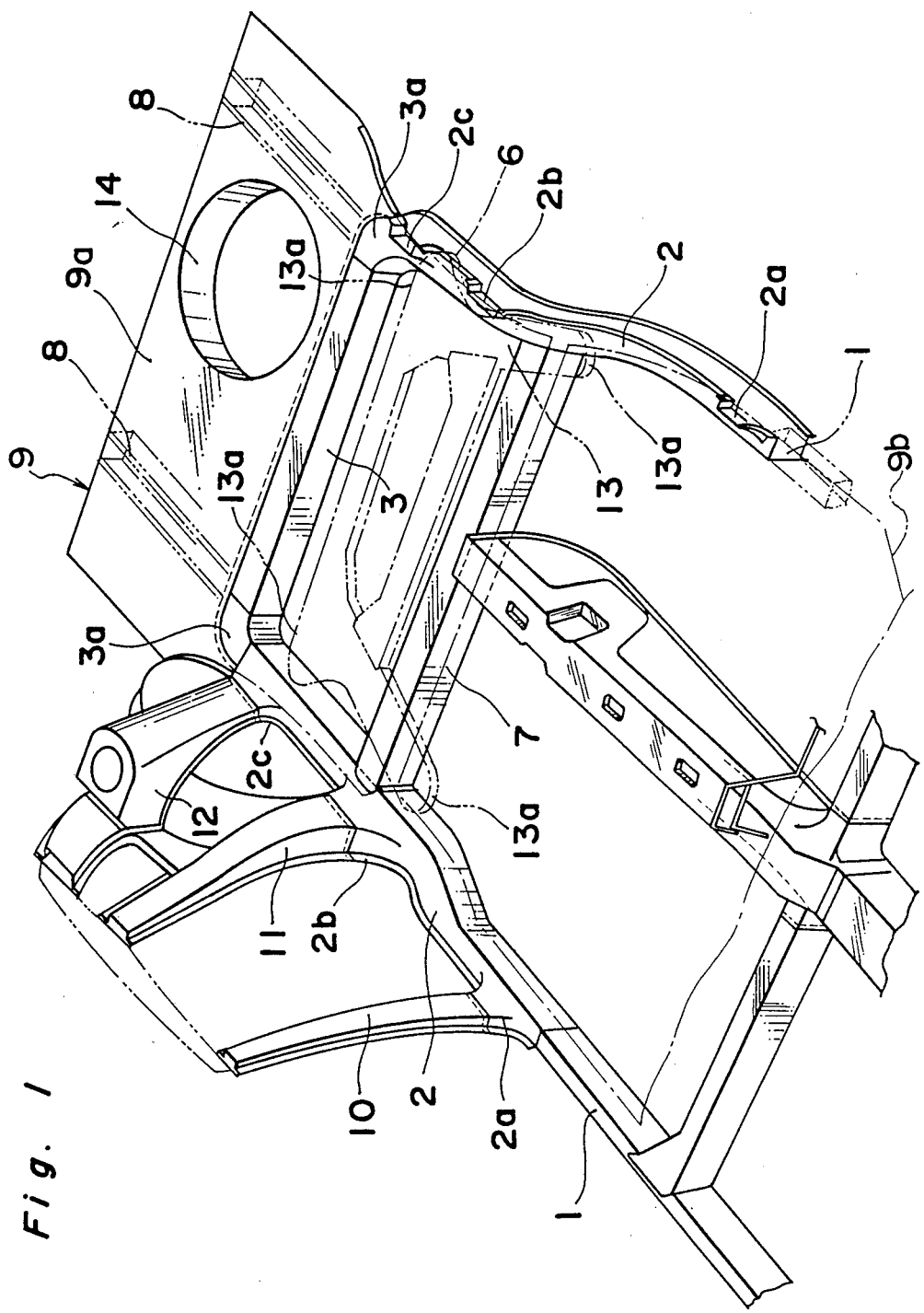
FIG. 1 is a perspective view of an automobile rear underbody structure embodying the present invention.

Referring first to FIGS. 1 to 6, an automobile rear underbody structure shown therein comprises a pair of side sills having a generally closed cross section, generally indentified by 1 and spaced apart from each other in a direction widthwise of the automobile body structure, and a pair of rear frame members generally identified by 2 and connected rigidly with the associated side sills 1 in an end-to-end butted fashion so as to extend therefrom rearwardly of the automobile body structure.

The rear frame members 2, which may be a frame having a generally closed cross section and which are spaced apart from each other in a direction widthwise of the automobile structure, have respective center pillars 10 and respective rear pillars 11 mounted thereon and secured at 2a and 2b so as to extend upwardly therefrom, said center and rear pillars 10 and 11 being spaced from each other in a direction longitudinally of the automobile body structure. It is to be noted that the joint 2a between each of the center pillars 10 and the associated rear frame member 2 is defined in the vicinity of the joint between the side sill 1 and the rear frame member 2 while the joint 2b between each of the rear pillars 11 and the associated rear frame member 2 is defined at a location generally intermediate of the length of the rear frame member 2. The rear frame members 2 also have respective suspension towers 12 rigidly mounted thereon, a lower end of each of said suspension towers 12 being rigidly jointed at 2c to a rear end of the associated rear frame member 2 adjacent the side sill 1.

The rear frame members 2 are connected together by means of first and second cross members 7 and 3 extending transversely or widthwise of the automobile body structure. Each of said cross members 7 and 3 may be a frame having a generally closed cross section. The first cross member 7 has its opposite ends rigidly secured to generally intermediate portions of the rear frame members 2 in the vicinity of the joints 2b while the second cross member 3 has its opposite ends rigidly connected to the respective rear ends of the rear frame members 2, thereby completing a so-called "perimeter structure".

Figure 2:
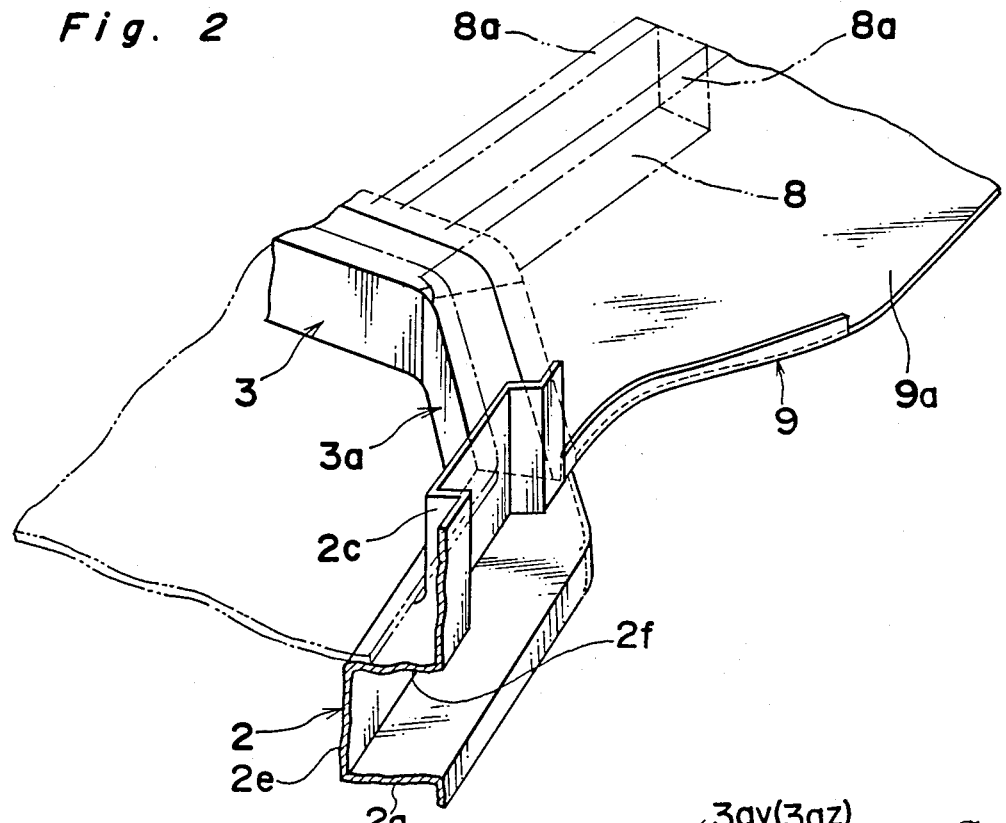
FIG. 2 is a perspective view, on an enlarged scale, of a portion of the rear underbody structure, showing the connection between one of rear frame members and a second cross member.
Figure 3:
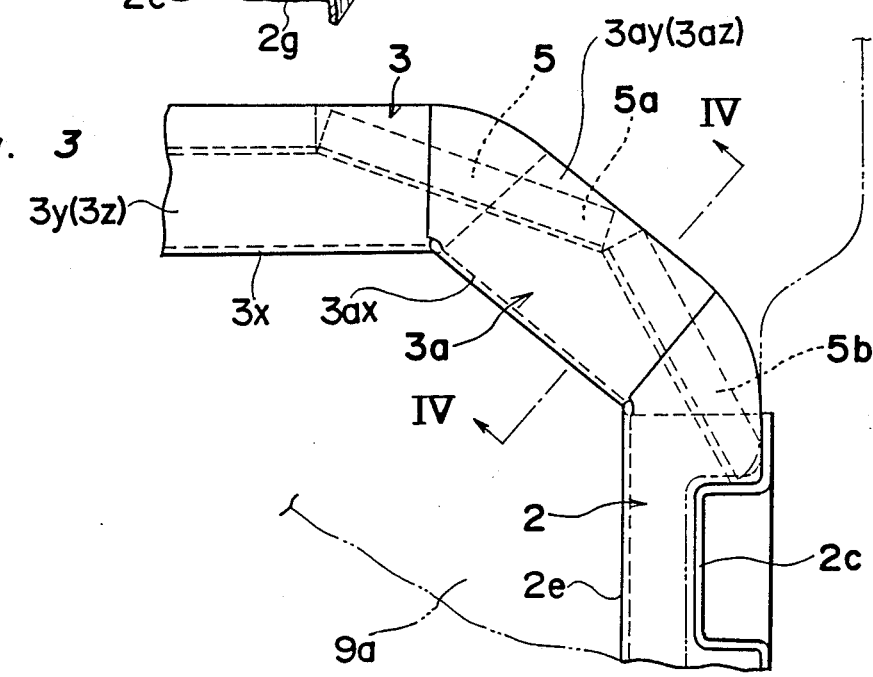
FIG. 3 is a top plan view of the portion of the rear underbody structure shown in FIG. 2.

As best shown in FIGS. 2 and 3, illustrating the details of the connection of one of the opposite ends of the second cross member 3 and the rear end of a respective rear frame member 2, a corner frame 3a having a generally U-shaped cross section open in a direction rearwardly of the automobile body structure is employed for each rear frame member 2 to provide a joint between the rear end of the rear frame member 2 and a corresponding end of the second cross member 3 having a shape generally similar to the shape of a chamfered or beveled corner. In describing the details of the joints between the opposite ends of the second cross member 3 and the respective rear ends of the rear frame members 2, reference will be hereinafter made to only one of the corner members 3a for the sake of brevity.

Referring still to FIGS. 2 and 3, at least the rear end of each of the rear frame members 2 so far illustrated has a generally U-shaped cross section provided by an upright wall 2e upper and lower walls 2f and 2g and open in a direction laterally outwardly of the automobile body structure. Similarly, each of the second cross member 3 and the associated corner member 3a has a generally U-shaped cross-section provided by an upright wall 3x or 3ax and upper and lower walls 3y or 3ay 3z or 3az and open in a direction rearwardly of the automobile body structure.

The corner member 3a is rigidly connected at the opposite ends thereof to the second cross member 3 and the rear frame member 2, respectively, while extending generally obliquely with respect to and between one of the opposite ends of the cross member 3 adjacent thereto and the rear end of the rear frame member 2 in a manner which will now be described. The upright wall 3ax of the corner member 3a is butt-welded at one end thereof to the upright wall 3x of the second cross member 3 and at the opposite end to the upright wall 2e of the rear frame member 2 while the opposite ends of each of the upper and lower walls 3ay and 3az of the corner member 3a overlap and are rigidly connected or otherwise lap-welded to the respective ends of the second cross member 3 and the rear frame member 2.

Figure 4:
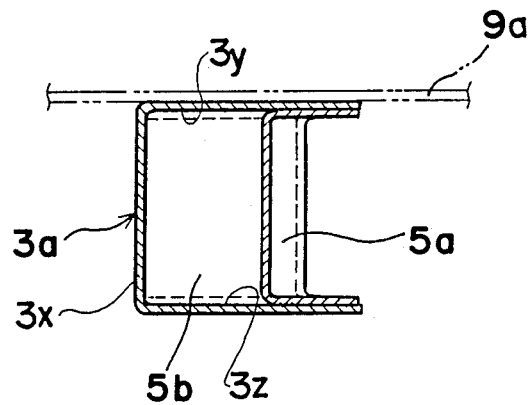
FIG. 4 is a cross-sectional view taken along line IV—IV on FIG. 3.
Figure 5:
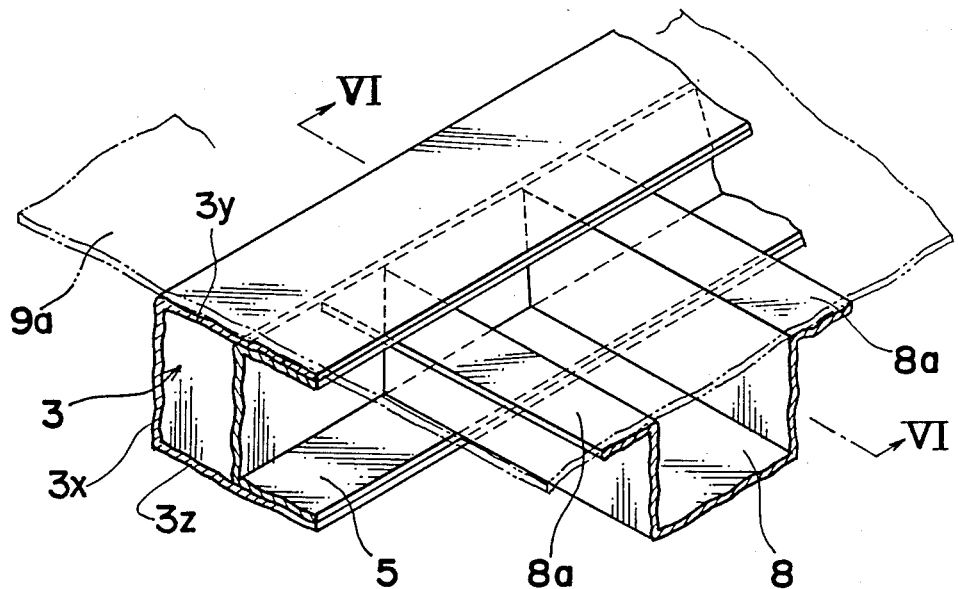
FIG. 5 is a perspective view of another portion of the rear underbody structure, showing the connection between the second cross member and one of the reinforcement frames.

While each of the corner members 3a are connected to the second cros member 3 and a respective rear frame member 2 in the manner as hereinabove described, the rear frame members 2, the corner members 3a and the second cross member 3 are all reinforced by a plurality of generally U-shaped reinforcement frames generally identified by 5. Each of these U-shaped reinforcement frames 5 has cross sectional dimensions somewhat smaller than the cross-sectional dimensions of each of the rear frame members 2, the corner members 3a and the second cross member 3 so that the U-shaped reinforcement frames 5 can be accommodated within the respective members 2, 3a and 3 to render the cross section of the members 2, 3a and 3 closed as best shown in FIGS. 4 and 5. With these reinforcement frames 5 accommodated within the respective members 2, 3a and 3, the reinforcement frames 5 are spot-welded to the members 2, 3a and 3 at preselected locations.

The reinforcement frames 5 may be connected together in a direction lenghtwise thereof in a butted fashion. However, some of the reinforcement frames 5 which are identified by 5a and 5b in FIG. 3 and are associated with each corner member 3a are so disposed as to extend across the joint between the corner member 3a and the adjacent rear frame member 2 and the joint between the corner member 3a and the second cross member 3, respectively, as clearly shown by the phantom lines in FIG. 3.

The open sides of the rear ends of the rear frames members 2 may be closed when a tire housing inner member 6 is secured thereto.

Figure 6:
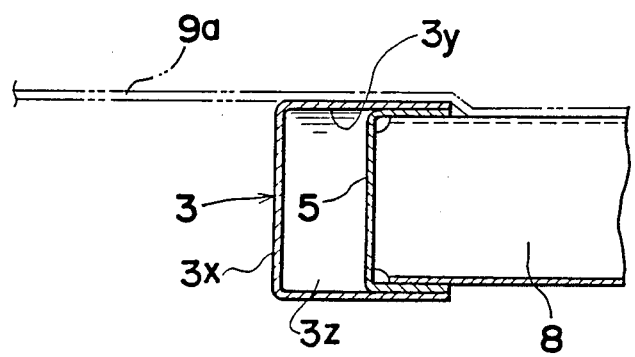
FIG. 6 is a cross-sectional view taken along line IV—IV in FIG. 5.
Figure 7:
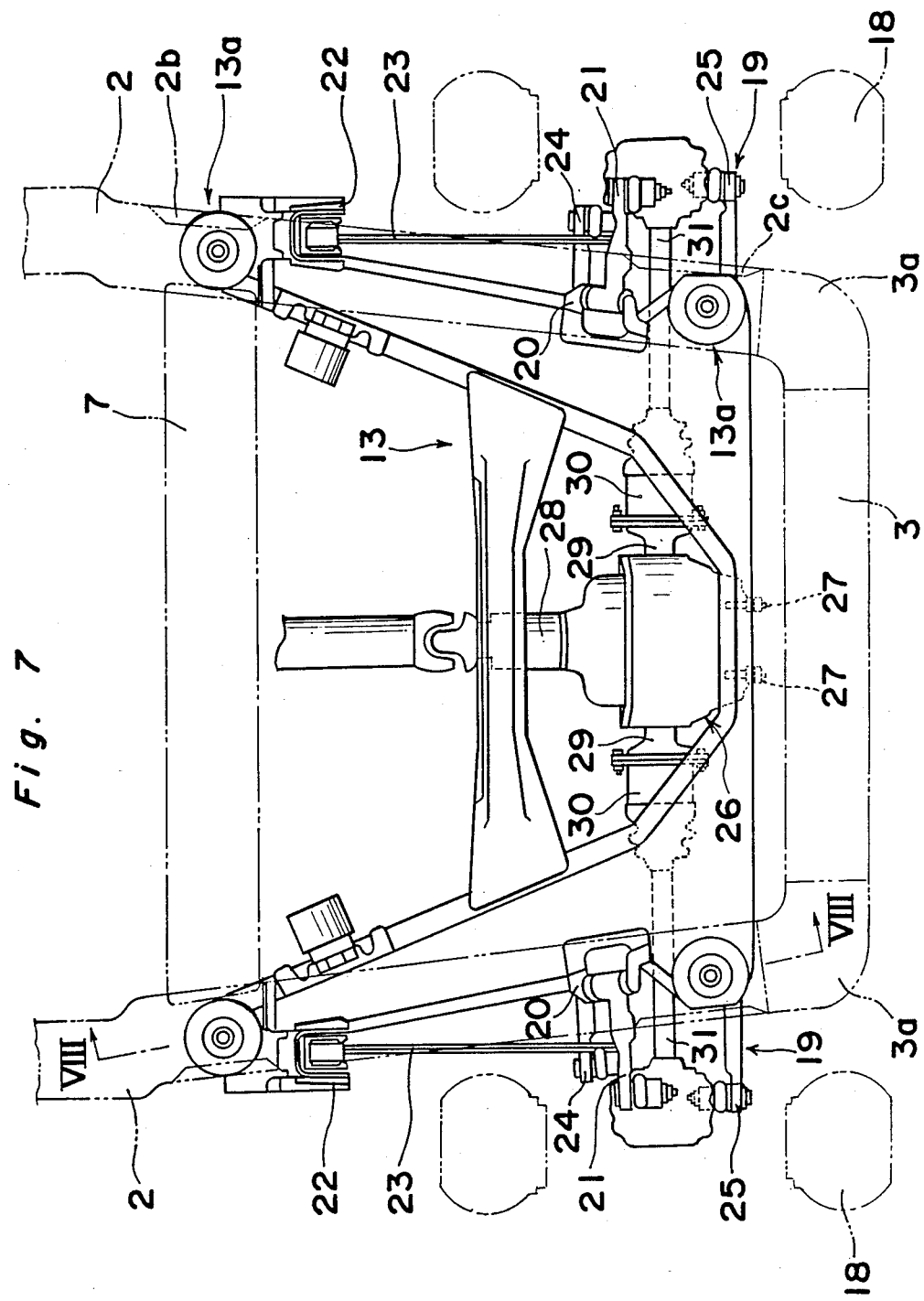
FIG. 7 is a top plan view of the rear underbody structure, showing the layout of a differential gear unit in relaion to a rear wheel suspension system.

The rear underbody structure also comprises a pair of longitudinal reinforcement frames 8 spaced apart from each other in a direction widthwise of the automobile body structure and extending rearwardly from the second cross member 3 in a generally parallel relationship therewith. Each of these reinforcement frames 8 has one end rigidly connected, while received in the reinforcement frames 5, to the second cross member 3 at a location adjacent the corresponding end of the second cross member 3, that is, adjacent the joint between the second cross member 3 and a respective corner member 3a, as best shown in FIGS. 5 and 6. Each of the reinforcement frames 8 has a generally U-shaped cross section open upwardly and a pair of longitudinal flanges 8a, facilitating the spot-welding thereof 5 lying in a plane generally parallel to the upper wall 3y of the second cross member 3.

Referring to FIGS. 1, 2, 5 and 6, a floor panel or boot panel is laid over the rear underbody structure. The booth panel shown has a two-piece construction including rear and front panel members 9a and 9b, the rear panel member 9a being mounted on, and spot-welded to, the first and second cross members 13 and 3, the rear ends of the rear frame members 2 and the longitudinal reinforcement frames 8. The front panel member 9b has a tunnel defined therein below which a drive shaft (not shown) extends in a direction longitudinally of the automobile body structure and is mounted on frame members including front end portions of the rear frame members 2 and the side sills 1 and is disposed at a level generally below the rear panel member 9a. It is to be noted that the rear panel member 9a may define the bottom of a trunk and is therefore formed with a circular recess, shown by 14 in FIG. 1, located between the longitudinal reinforcement frames 8 and constituting a tire casing. Alternatively, the boot panel may have a one-piece construction, in which case a step is provided in the boot panel at a location aligned with the first cross member 13.

Figure 8:
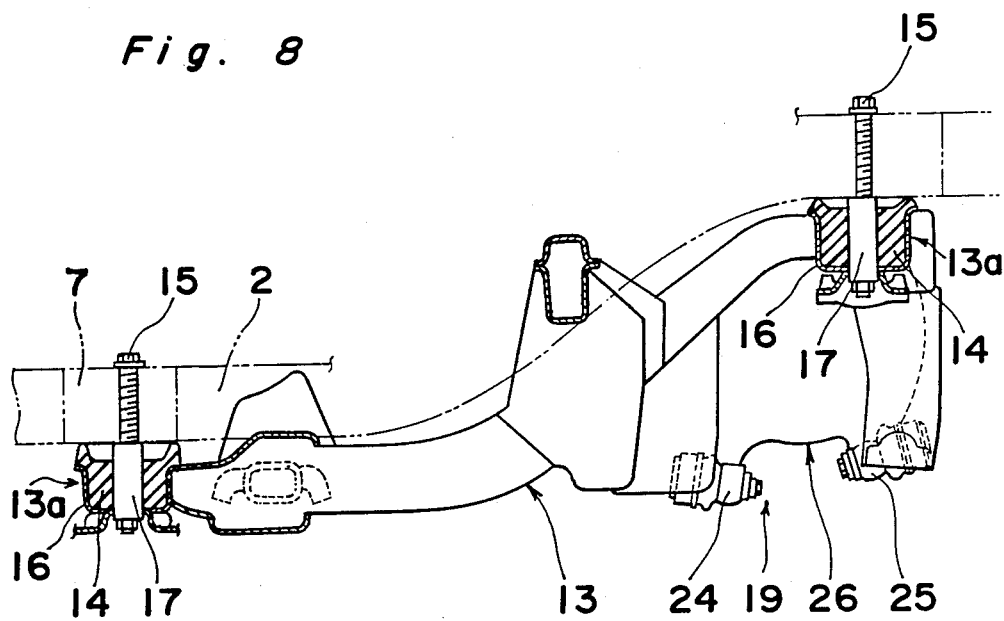
FIG. 8 is a cross-sectional view taken along line VIII—VIII in FIG. 7.
Figure 9:
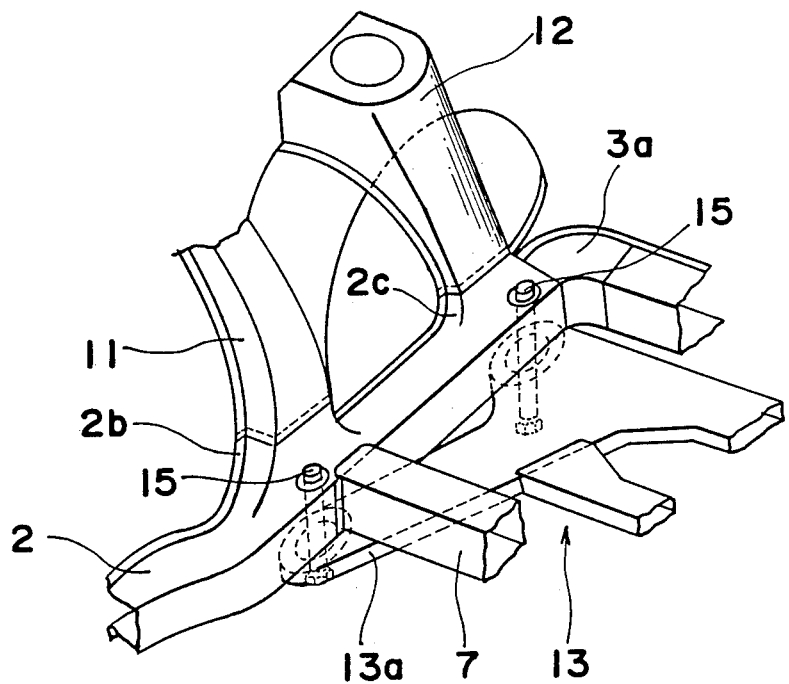
FIG. 9 is a fragmentary perspective view showing the connection between a portion of the rear underbody structure and one of the rear wheel suspension members.

Referring to FIGS. 1 and 7 to 9, positioned below the rear frame members 2 is a suspension support member 13 having four fitting corners 13a integral therewith. Two of the four fitting corners 13a which are located on the side facing the front of the automobile body structure, that is the front fitting corners 13a, are elastically yieldably connected to the respective joints between the rear frame members 2 and the first cross member 7 in a manner which will now be described with particular reference to FIG. 8 showing only one of the front fitting corners 13a.

As shown in FIG. 8, each of the front fitting corners 13a of the suspension support member 13 has an elastic mount including an inner sleeve 17, an outer sleeve 16 and a rubber bushing 14 assembled together with the rubber bushing 14 positioned around the inner sleeve 17 so as to occupy an annular space between the inner and outer sleeves 17 and 16. Each front fitting corner 13a is elastically yieldably connected to a joint between the first cross member 7 and a respective rear frame member 2 through a fitting bolt 15 passing through the inner sleeve 17 of the elastic mount so as to substantially isolate vibrations which would be transmitted from the suspension support member 13 to the automobile body structure.

The other two of the four fitting corners 13a which are located on the opposite side facing the rear of the automobile body structure, that is, the rear fitting corners 13a, are also elastically yieldably connected to the respective joints between the rear frame members 2 and the second cross member 3 in a manner similar to that described in connection with the front fitting corners 13a. More specifically, as shown in FIG. 8, each of the rear fitting corners 13a of the suspension support member 13 has an elastic mount including an inner sleeve 17, an outer sleeve 16 and a rubber bushing 14 assembled together with the rubber bushing 14 positioned around the inner sleeve 17 so as to occupy an annular space between the inner and outer sleeves 17 and 16. Each rear fitting corner 13a is elastically yieldably connected to the joint between the second cross member 3 and the adjacent rear frame member 2 through a fitting bolt 15 passing through the inner sleeve 17 of the elastic mount so as to substantially isolate vibrations which would be transmitted from the suspension support member 13 to the automobile body structure.

In the vicinity of each of the rear fitting corners 13a of the suspension support member 13, there is provided a suspension mechanism, generally identified by 19, for supporting an automobile rear wheel. This suspension mechanism 19 for each of the automobile rear wheels 18 includes an upper lateral link 21 having an inner end pivotally connected to the suspension support member 13 through a bracket 20 mounted thereon at a location forwardly of the adjacent rear fitting corner 13a and also having an outer end pivotally connected to an axle hub for a rear wheel 18, a trailing arm 23 having a front end pivotally connected to the suspension support member 13 through a bracket 22 mounted thereon at a location rearwardly of the adjacent front fitting corner 13a and also having an outer end pivotally connected to the axle hub for a rear wheel 18, a front lateral link 24 having an inner end pivotally connected to the suspension support member 13 through a support member secured thereto at a rear portion of the suspension support member 13 and also having an outer end pivotally connected to the axle hub for a rear wheel 18, and a rear lateral link 25 having an inner end pivotally connected to a substantially intermediate portion of the suspension support member 13 and also having an outer end pivotally connected to the axle hub for a rear wheel 18.

A differential gear unit identified by 26 is supported by the suspension support member 13 through a plurality of bolts and nuts 27 secured to a rearmost portion of the suspension member 13. As is well known to those skilled in the art, the differential gear unit 26 has an input shaft 28, drivingly coupled with an automotive power plant through the driver shaft, and output stud shafts 29 extending generally perpendicular to the input shaft 28 and away from each other. The output stud shafts 29 are in turn drivingly coupled with the rear wheels 18 through respective swimming shafts 31 so that the drive produced from the power plant can be transmitted to the rear wheels 18.

The present invention having been fully described, it will be readily understood that, since the rear frame members and the cross members are connected together to provide the perimeter structure, the rigidity of the rear underbody structure can be advantageously increased enough to substantially minimize the crushing of the rear end portion of the automobile body structure upon a collision. Specifically, the provision of the longitudinal reinforcement frames extending rearwardly from the second cross member is advantageous in that the longitudinal reinforcement frames may undergo deformation to absorb shocks and impacts which would be imposed on the rear portion of the automobile body structure during a collision, thereby lessening the severity of the transmission of the impact to the perimeter structure. The longitudinal reinforcement frames may also minimize the crushing of the trunk when the impact of a collision is relatively small.

It is to be noted that the physical strength and the rigidity of the rear underbody structure according to the present invention can be chosen as desired by suitably selecting the wall thickness of the U-shaped reinforcement frames accommodated within the rear frame members and the second cross member.

Also, since the suspension support member is supported with the rear fitting corners connected to the joints between the rear frame members and the second cross member, loads which would be imposed on the fitting corners of the suspension support member through the lateral links in respective up and down, front and rear and left and right directions, and a force such as a reactive force produced by a torque in the differential gear unit, can be advantageously distributed to the rear frame members 2 and the second cross member. Moreover, since the joints between the rear frame members and the second cross member are firm and rigid, the suspension support member can be supported in a stabilized fashion, thereby contributing to the increased rigidity of the rear underbody structure.

Furthermore, since the front fitting corners of the suspension support member are connected to the joint between the side sills and the rear frame members, any possible external force which would act on the front fitting corners of the suspension support member can be advantageously distributed to the rear frame members and the first cross member, thereby further contributing to the increased rigidity of the rear underbody structure.

Although the present invention has fully been described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

I claim:

1. An underbody structure of an automotive vehicle, which comprises:
   a pair of side sills each having a generally closed cross section and extending of the automotive vehicle, said side sills spaced apart from each other in a direction extending widthwise of the automotive vehicle;
   A respective rear frame member connected to and butting end-to-end against each one of said side sills and extending rearwardly of the automotive vehicle;
   a first cross member connected at its opposite ends to the rear frame members, respectively, so as to extend widthwise of the automotive vehicle in the same plane in which the rear frame members lie; and
   a second cross member connected at its opposite ends to the rear frame members, respectively, so as to extend widthwise of the automotive vehicle in said plane, said second cross member being disposed rearwardly of the first cross member with respect to the automotive vehicle.

2. The underbody structure as claimed in claim 1, wherein each said rear frame member has a joint for securing a center pillar thereto disposed at a front end thereof.

3. The underbody structure as claimed in claim 1, wherein a rear end of each said rear frame member remote from the side sill connected thereto has a joint for supporting a suspension tower thereon.

4. The underbody structure as claimed in claim 1, and further comprising a boot floor member having a front portion and a rear portion, said front portion being positioned at a level lower than the rear portion thereby defining a step therebetween and having a tunnel defined therein for accommodating a drive shaft thereunder, and wherein said first cross member extends in the vicinity on the step defined by the boot floor member and said second cross member has its opposite ends connected to respective rear ends of the rear frame members remote from the side sills.

5. The underbody structure as claimed in claim 4, wherein one edge of the rear portion of the boot floor member adjacent the step is connected to the first cross member.

6. The underbody structure as claimed in claim 4, wherein each of the rear frame members and the second cross member is constituted by a frame having a generally closed cross section.

7. The underbody structure as claimed in claim 6, and further comprising a respective corner frame extending between each said rear frame member and said cross member, each of the opposite ends of the second cross member connected to the rear end of a respective said rear frame member through a respective said corner frame.

8. The underbody structure as claimed in claim 7, wherein a respective portion of the second cross member adjacent each said corner frame overlaps a portion of the corner frame at the joint therebetween.

9. The underbody structure as claimed in claim 7, and further comprising a reinforcement frame provided in the second cross member and each said corner frame on respective sides of the second cross member.

10. The underbody structure as claimed in claim 4, and further comprising at least one longitudinal reinforcement frame connected at one end of the second cross member and extending rearwardly of the automobile vehicle.

11. The underbody structure as claimed in calim 10, wherein said longitudinal reinforcement frame has a cross-sectional shape generally similar to the shape of an inverted "U" having a pair of longitudinal flanges, said longitudinal reinforcement frame being closed by a rear portion of the boot floor member secured atop the longitudinal flanges.

12. The underbody structure as claimed in claim 1, and further comprising a suspension support member fitted in the vicinity of joints between the rear frame members and the first cross member and /or the second cross member.

13. The underbody structure as claimed in claim 12, wherein said suspension support member is fitted in the vicinity of respective joints between each said rear frame member and the first and second cross members, each said rear frame member has a joint for supporting a suspension tower thereon, and said second cross member is connected at its opposite ends in the vicinity of the joints at which the suspension towers are supported.

14. An underbody structure of an automotive vehicle which comprises:
   a pair of side sills each having a generally closed cross section and extending longitudinally of the automotive vehicle, said side sills spaced apart from each other in a direction extending widthwise of the automotive vehicle;
   a respective rear frame member connected to and butting end-to-end against each of said side sills and extending rearwardly of the automotive vehicle; and
   a cross member connected at its opposite ends to the rear frame members, respective, so as to extend widthwise of the automotive vehicle.

15. The underbody structure as claimed in claim 14, wherein each of the opposite ends of the cross member is connected to the rear end of the adjacent rear frame member through a respective corner frame.

16. The underbody structure as claimed in claim 15, and further comprising a respective corner frame extending between each said rear frame member and said second cross member, each of the opposite ends of the second cross member connected to the rear end of a respective said rear frame member through a respective said corner frame.

17. The underbody structure as claimed in claim 15, and further comprising a reinforcement frame provided in the cross member and end said corner frame on respective sides of the cross member.

* * * * *